(12) United States Patent
Biller et al.

(10) Patent No.: US 9,050,233 B2
(45) Date of Patent: Jun. 9, 2015

(54) CASKET WITH MOVEABLE BOTTOM PANELS

(71) Applicants: Yeshaye Biller, Baltimore, MD (US); Elchonon Zohn, Richmond Hill, NY (US)

(72) Inventors: Yeshaye Biller, Baltimore, MD (US); Elchonon Zohn, Richmond Hill, NY (US)

(*) Notice: Subject to any disclaimer, the term of this patent is extended or adjusted under 35 U.S.C. 154(b) by 0 days.

(21) Appl. No.: 14/340,738

(22) Filed: Jul. 25, 2014

(65) Prior Publication Data

US 2015/0067997 A1 Mar. 12, 2015

Related U.S. Application Data

(60) Provisional application No. 61/858,508, filed on Jul. 25, 2013.

(51) Int. Cl.
*A61G 17/007* (2006.01)
*H04L 29/06* (2006.01)
*A61G 17/04* (2006.01)
*H04L 29/12* (2006.01)

(52) U.S. Cl.
CPC ........ *A61G 17/0073* (2013.01); *H04L 63/1441* (2013.01); *H04L 61/1511* (2013.01); *H04L 63/1416* (2013.01); *A61G 17/04* (2013.01); *A61G 2017/041* (2013.01); *A61G 2017/042* (2013.01); *A61G 2017/044* (2013.01)

(58) Field of Classification Search
CPC . A61G 17/00; A61G 17/007; A61G 17/0073; A61G 17/04; A61G 2017/00; A61G 2017/004; A61G 2017/044; A61G 2017/041; A61G 2017/042; B65D 5/445; B65D 5/556; B65D 90/02
USPC ............. 27/2, 4, 12, 13, 19; 229/122.34, 199; 220/653
See application file for complete search history.

(56) References Cited

U.S. PATENT DOCUMENTS

| | | | | |
|---|---|---|---|---|
| 4,123,831 A * | 11/1978 | Covington | | 27/2 |
| 4,146,948 A * | 4/1979 | Royce et al. | | 27/2 |
| 7,200,906 B2 * | 4/2007 | Darst et al. | | 27/2 |
| 2005/0050701 A1* | 3/2005 | Davis et al. | | 27/28 |
| 2008/0034562 A1* | 2/2008 | Wensley | | 27/3 |
| 2012/0060334 A1* | 3/2012 | Gesell et al. | | 27/1 |
| 2014/0183186 A1* | 7/2014 | Buskermolen et al. | | 220/1.5 |

* cited by examiner

*Primary Examiner* — William Miller
(74) *Attorney, Agent, or Firm* — White & Case LLP

(57) ABSTRACT

A casket comprises four sides, a cover, a plurality of fixed bottom beams extending across the bottom width of the casket, and at least one moveable bottom panel located inside the casket and on top of the fixed bottom beams. At least one rope is affixed to each moveable bottom panel and, the rope extends through the casket to the outside. The inventive casket places the body of the deceased person in closer contact with the earth to promote natural disintegration of the body and in accordance with burial customs of religious faiths requiring such intimate contact of the body with the earth.

10 Claims, 4 Drawing Sheets

US 9,050,233 B2

CASKET WITH MOVEABLE BOTTOM PANELS

This application claims the priority benefit of U.S. provisional patent application Ser. No. 61/858,508, filed on Jul. 25, 2013, the contents of which are incorporated herein by reference in their entirety.

BACKGROUND OF THE INVENTION

In accordance with historical practices, most human burials conventionally take place in the earth. Certain religious faiths have burial customs which require earth burial in a manner which encourages rapid natural disintegration of a person's body. In the United States and many other countries, the body is typically placed in a casket for containment and transportation to the place of burial. However, burial in a conventional box-like casket insulates the body from the earth and prevents the body of the deceased person from being in intimate contact with the earth, and thereby delays disintegration of the body. Burial in a conventional casket is also not in full compliance with burial customs which call for intimate contact of a body with the earth.

Certain caskets contain a number of small holes drilled in the bottom of the casket. These holes assist in accelerating disintegration of the body, but the body is nevertheless still separated from the earth and not substantially in contact with the earth. Consequently, the burial is not in full compliance with religious customs which call for such intimate contact with the earth. In addition, disintegration of the body in the casket is slower than if the body were buried directly in the earth.

Accordingly, there is a need for burial caskets which place the body of the deceased person in closer contact with the earth to promote natural disintegration of the body and in accordance with religious burial customs.

BRIEF DESCRIPTION OF THE INVENTION

The present invention is intended to address the above-described deficiencies in the prior art, and is directed to a casket which exposes the backside of the body of a deceased buried person to the earth in order to satisfy the above-mentioned purposes and requirements. The present invention is directed to a casket comprising four sides, a cover, a plurality of fixed bottom beams extending across the width of the casket, and at least one moveable bottom panel located inside the casket and on top of the fixed bottom beams. At least one rope is affixed to each moveable bottom panel and, the rope extends through the casket to the outside.

BRIEF DESCRIPTON OF THE FIGURES

Figure 1:
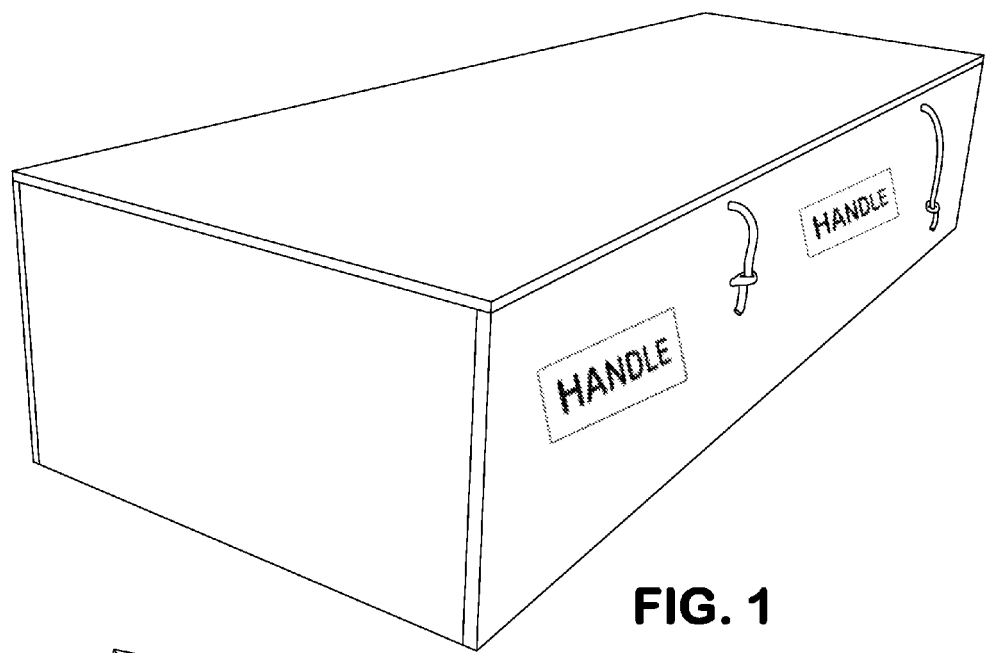
FIG. 1 is a right perspective view of the outside appearance of an embodiment of the inventive casket, and which illustrates the ropes to be drawn to release the body from the casket.
Figure 3:
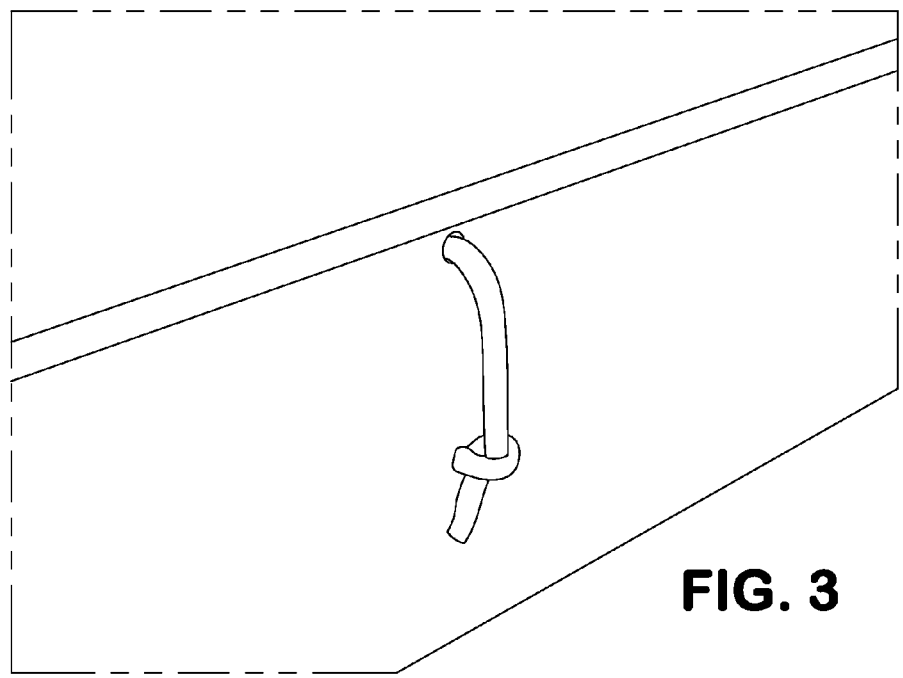
Figure 4:
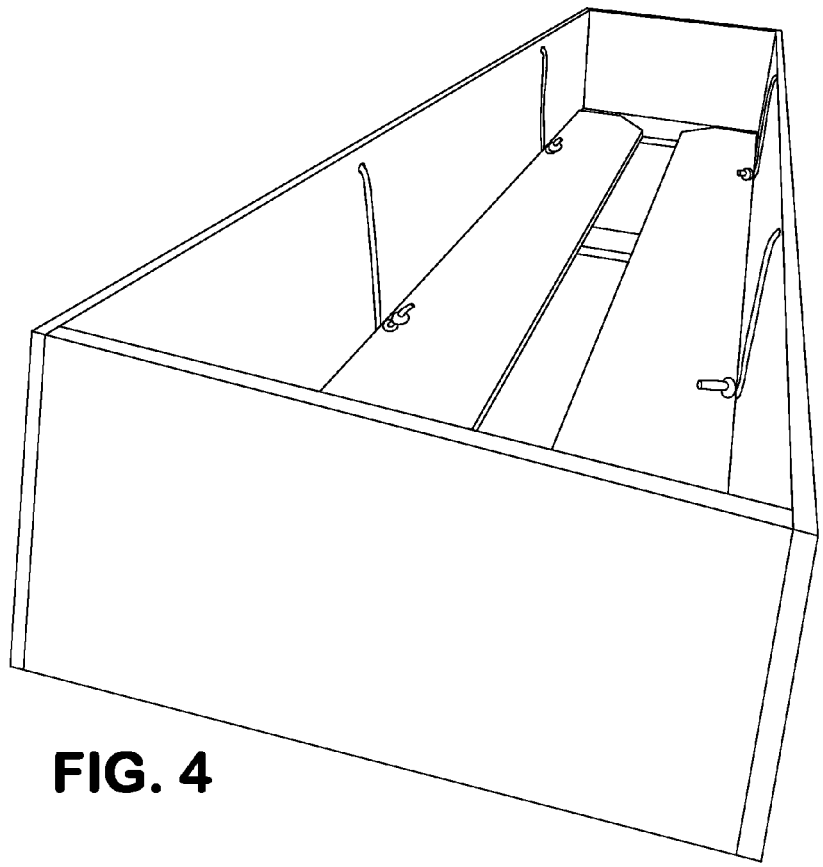
Figure 5:
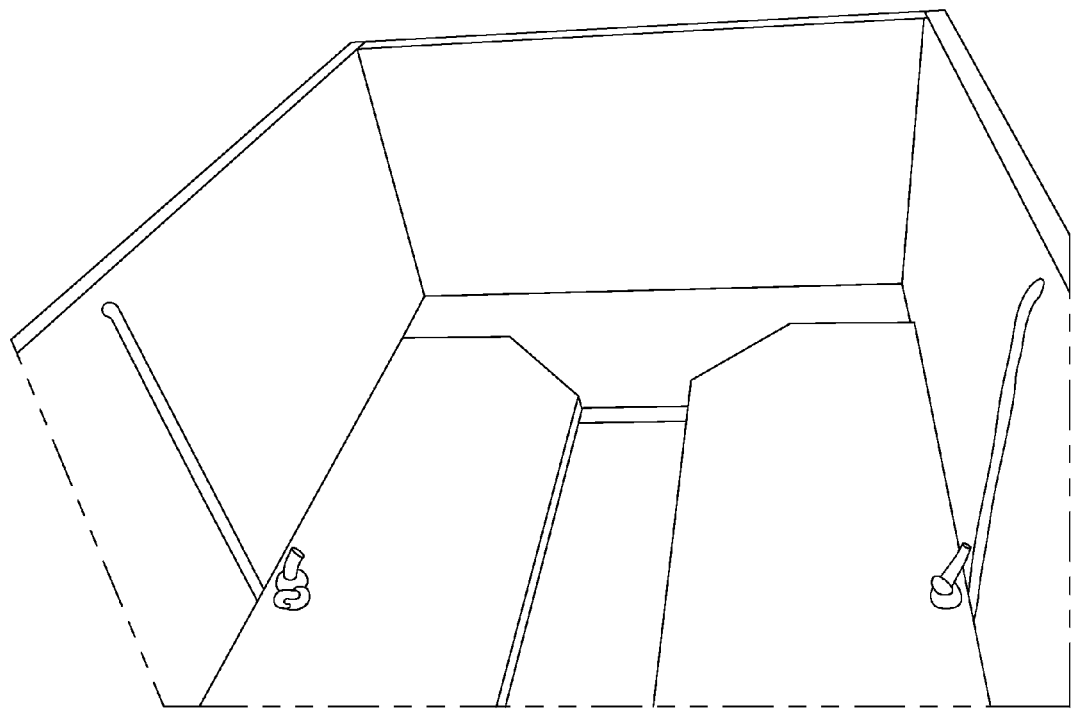
Figure 6:
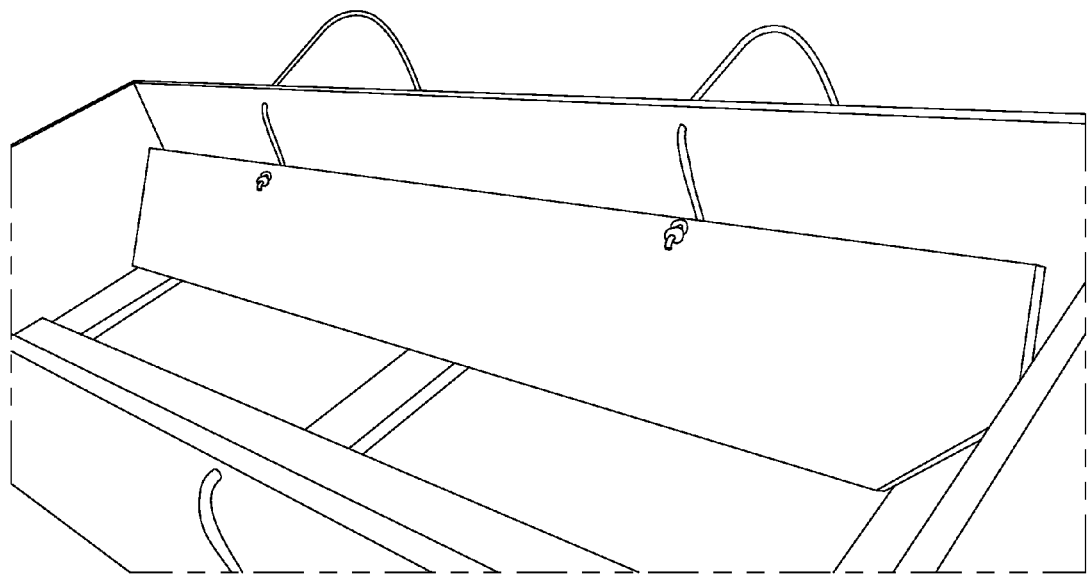
Figure 7:
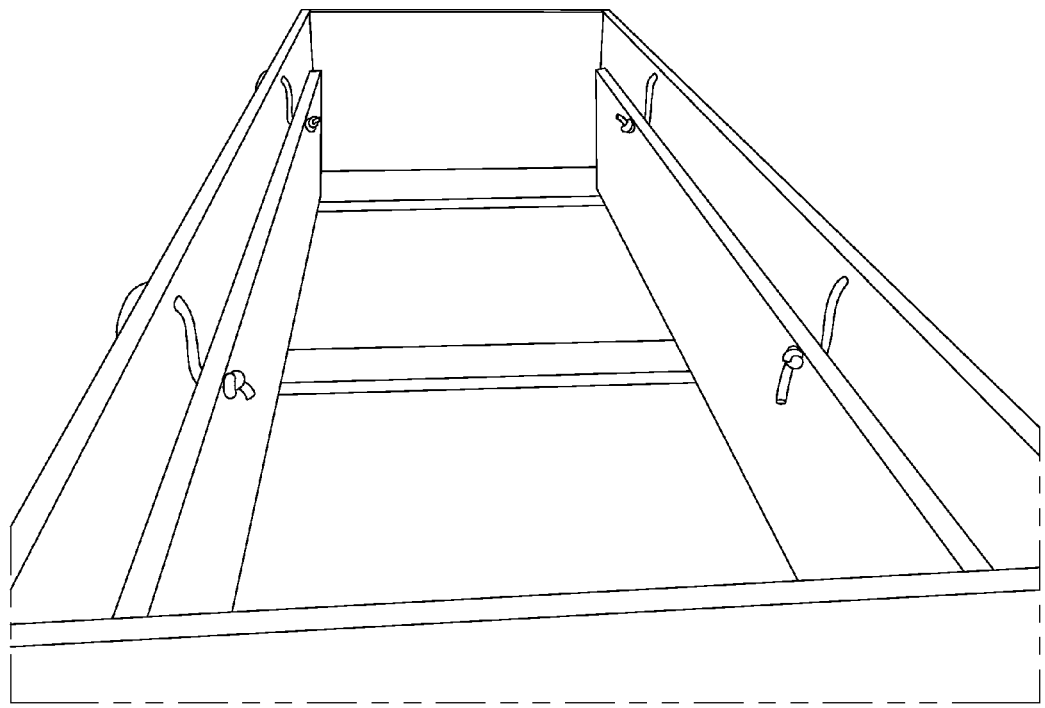
Figure 8:
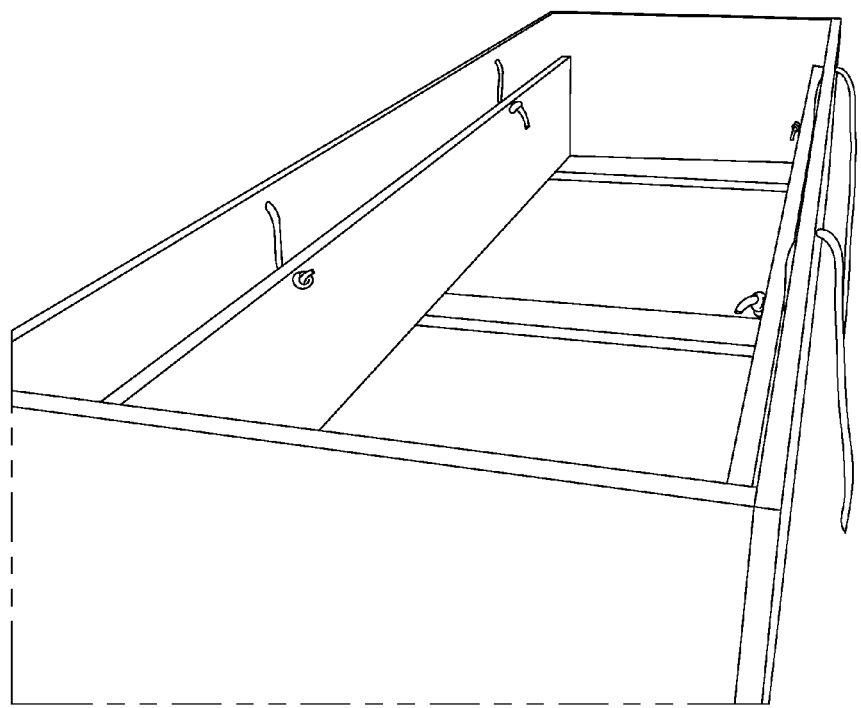

FIG. 3 provides a close-up view of the rope shown in the embodiment of FIG. 1;

FIG. 4 is a perspective view of the interior of the embodiment of FIG. 1 into which a body is placed and prior to release of the body;

FIG. 5 is a close-up view of the embodiment shown in FIG. 1 showing the mitering of the moveable bottom panels to accommodate a person's head;

FIG. 6 is a right perspective view of the embodiment shown in FIG. 1 and shows the ropes being drawn up. The action of drawing the ropes causes the moveable bottom panels to be pulled up and away from the body of the deceased person (not shown), thereby releasing the body for maximal contact with the earth;

FIG. 7 is a front perspective view of the embodiment in FIG. 1 and shows the moveable bottom panels in the casket in the fully-released position; and FIG. 8 is an angled perspective view of the embodiment of FIG. 1 showing the moveable bottom panels in the fully-released position.

DETAILED DESRIPTION OF THE INVENTION

For ease of discussion and illustration, the principles of the invention will be described with reference to an embodiment having two moveable bottom panels on opposite sides of the casket. However, those of skill in the art will understand that the principles of the invention are equally applicable to embodiments having other numbers of moveable bottom panels, such as two half-length panels on each side of the casket, or one full-length panel on one side of the casket and two half-length panels on the other side of the casket, and all such embodiments are encompassed by the present invention. Within the scope of the invention, it is also possible for one of the bottom panels running along the length of the casket to be fixed in place, for example, using glue, pegs, nails, or other fasteners, and for a second bottom panel to be moveable to release the body in position.

The expression "releasing the body" is to be understood to mean the process of causing the moveable bottom panel(s) to slide away from under the body and upward until the panels are at their fully-extended position and flush with and along the side walls of the casket.

The fixed bottom beams of the casket extend across the width of the bottom of the casket and provide structural stability to the casket as well as support for the body contained therein. There may be any number of fixed bottom beams extending from side to side of the casket. In one embodiment of the invention, there are three fixed bottom beams: a fixed bottom beam is located at each end of the casket to support the head and feet of the body, and a third fixed bottom beam is located at the center or midpoint of the casket to support the middle of the body. For larger-sized caskets, there may be, for example, two center beams to support the chest and buttock areas of the body. The bottom beams may have any width, such as about 4 inches wide, about 6 inches wide, or about 9 inches wide, and the bottom beams may have the same or different dimensions such as width or thickness.

The moveable bottom panels are placed on top of the fixed bottom beams and the body is placed in the casket on top of the moveable bottom panels. After the casket has been lowered into the earth, the side ropes are drawn or pulled up to slide the moveable bottom panels away from the body and up along the inner sides of the casket.

There may be any number of ropes, cords or similar elements used to draw the moveable bottom panels away from the body. For example, there may be two side ropes affixed to each moveable panel, one rope at each end of the panel. In other embodiments, there may be a single rope per panel, or there may be three, four or more ropes per panel. When drawing or pulling the ropes, the moveable panels will slide away from the body and upward until the panels are at their full extended position and flush with and along the side walls of the casket. Once the moveable panels are fully extended, the ropes will become taut, preventing further movement of the moveable panels, and thereby providing an indication to the individual(s) pulling the ropes that the body has been fully released. Instead of a plurality of ropes, there may also be a single rope threaded at a plurality of locations on a particular moveable panel.

To avoid long ropes dangling from the casket, the ropes can be trimmed, tied, or otherwise adjusted so that only a small portion of their length extends outside the casket prior to burial, while the remaining lengths of the ropes are located inside the casket. Just prior to positioning the casket in the earth, the ropes can be partly extended from the casket (but without releasing the body) so that the ropes are near the surface of the soil at the appropriate time for release of the body, thereby avoiding the need for pallbearers or other mourners to reach down in the grave to retrieve the ropes.

The ropes may be provided with one or more indicia or kinds of indicia, such as painted lines, dots, or knots, to indicate various points on the rope. For example, a first indicium such as a knot on the ropes may indicate to pallbearers that the ropes have reached a maximal extension point and that further extension will release the body, a situation which clearly should take place only after the casket has been positioned in the earth. A second indicium such as a painted line on the ropes may indicate that the ropes have reached their maximal extension and that the body has been fully released in the grave. The ropes may be loosely tied to the moveable bottom panels so that the ropes untie after the body is released and are removed from the casket and grave, or they may be firmly tied or otherwise affixed to the bottom panels and will remain in the grave after burial.

The ropes or cords can be manufactured from any kind of material, although in accordance with the principles of rapid disintegration of the body, the ropes can be manufactured from a biodegradable material such as sisal, cotton, or hemp. The ends of ropes outside the casket may optionally be looped or provided with handles or similar elements to facilitate drawing the ropes.

To facilitate drawing the side ropes, there will typically be holes drilled through the casket. These holes can be at the sides of the casket, or at the top through the casket cover. When placed at the side of the casket, the holes can be drilled at an angle, such as a 45-degree angle, to facilitate drawing or pulling the ropes to release the body after the casket has been placed in the earth for burial.

The weight of the body on top of the moveable bottom panels is sufficient to keep the moveable bottom panels in their designated positions before burial, and the body will not fall out or become injured prior to burial. Consequently, the moveable bottom panels do not need to be bonded or otherwise affixed to the casket. However, in certain embodiments of the invention, it may be useful to employ releasable temporary fasteners such as pins or glue to prevent inadvertent or premature movement of the moveable bottom panels. When the ropes are drawn, the temporary fasteners break, become unglued, or otherwise fail, thereby allowing the moveable bottom panels to slide away from the body and upward as previously discussed.

Burial of a body in the earth in the manner as provided by the present invention is generally not prohibited by state regulations. The deceased person's body can be dressed or wrapped in any kind of clothing or ritual garment, such as a shroud, sheet, burial garment, or a suit or dress in accordance with customary burial practices before placement in the casket.

The casket visually has a boxlike shape that is customary for funerals. The inventive casket can also be used for both open-casket funerals and closed-casket funerals, as are known in the art.

It is clear that use of the inventive casket is not restricted to those of any one particular faith or religious belief. The casket can also be used by individuals who wish to have a "green burial" as an earth-friendly alternative to cremation, which involves burning of fossil fuels to consume the body and which can be polluting to the environment.

In a further embodiment of the invention, the casket may optionally further comprise a nonstructural sheet which extends across the inside or outside bottom of the casket in a manner which does not interfere with the principles of the invention and the operation of the moveable bottom panels, or which does not delay disintegration of the body. The nonstructural sheet can be made of any kind of material such as fabric or paper. Such an optional feature would be useful to hide the structure of the bottom of the casket from viewers who may be disconcerted to see the structure of the bottom of the casket, for example, during a procession to the cemetery. The nonstructural sheet can optionally be removed from the casket in a respectful manner immediately before burial. Alternatively, the nonstructural sheet can be fastened to the moveable bottom panels in such a manner that drawing or pulling the ropes causes the nonstructural sheet to rip or fail at a predetermined location (such as along a preweakened seam) concurrently with the release of the body as discussed.

The casket and its components can be formed of any material, which can be biodegradable or nonbiodegradable, as well as combinations thereof. Examples of biodegradable materials are wood, wood pulp, paper, and particleboard. Examples of non-biodegradable materials are metal and plastic. When the casket is devoid of nonbiodegradable structural components, the casket and the body contained therein will substantially or entirely decompose, thereby providing an environmentally friendly burial in accordance with particular religious practices.

The casket can have any kind of shape or size, although generally the casket will have a conventional rectangular or tapered boxlike shape. Caskets can be custom-manufactured for a particular individual, or caskets can be prepared in a number of standardized sizes as is customary in the industry. Exemplary approximate dimensions of caskets prepared in accordance with the invention are as follows:

75 inches long×26 inches wide×14 inches high;
72 inches long×24 inches wide×12 inches high;
76 inches long×28 inches wide×18 inches high; and
78 inches long×28 inches wide×16 inches high.

The width of the moveable bottom panels will generally be slightly less than half of the casket width, thereby giving a small gap, between the moveable bottom panels.

The moveable bottom panels will be selected so that the gap is no larger than, for example, about 1 inch, about 2 inches, about 3 inches, about 4 inches, etc., in width to prevent the body from falling out of the casket before burial. The width of the gap will be smaller than the width of a typical human body, and will vary depending on the particular embodiment of the invention. A maximum gap width can be about 8 inches, although this will depend upon the particular embodiment of the invention.

In one embodiment of the invention, two moveable bottom panels, each having a width of about 10 inches, are placed on the fixed bottom beams, and the casket is about 24-28 inches wide, thereby providing a gap (visible in the Figures) of about 4-8 inches between the moveable bottom panels. The gap will run the length of the casket, and the person's body will rest on top of this gap while resting in the casket. The body will be clothed or wrapped in a shroud or other garment, and will be wider than the gap, thereby not in danger of falling out of the casket. Regardless, the structural arrangement itself of the moveable bottom panels resting on the fixed bottom beams prevents the body from falling out of the casket before burial.

The inventive casket can optionally have additional features as are known in the art, such as handles to assist in transporting the casket, or the casket can be affixed or imprinted with a religious symbol or other indicia, such as a Star of David, cross, crescent, tree, or flag, for spiritual or decorative reasons, or for functional reasons such as to indicate the position of the head and/or feet. A plaque providing the name of the person buried within can also be affixed to the casket, or the name of the deceased can be imprinted on the surface of the casket. Such decorative elements can be applied to the casket by carving, painting, gluing, burning, or other techniques.

Any conventional fasteners can be used to assemble the inventive casket including, but not limited to, dowels, pegs, pins, screws, glue and nails as well as combinations thereof. In one embodiment of the invention, fasteners are manufactured from the same material as the casket, for example, wood. Such manufacturing techniques will be evident and known by those of skill in the art.

As the casket is intended to enhance and not retard disintegration of the body, the casket will not be hermetically sealed from the earth.

In an embodiment of the invention, the cover of the casket is the same size as, or slightly smaller than, the dimensions of the casket, so that the top of the casket is flush with and does not extend over the sides of the casket. For example, the cover can be about ½ inch or 1 inch shorter than the length and/or width of the casket. Such an feature reduces the chances that the top of the casket will catch along the sides of the grave as the casket is lowered into the earth. The top of the casket can be closed shut with pegs, glue, nails or other materials before burial.

In an embodiment of the invention, opposing corners of the moveable bottom panels can be mitered so that the head of the deceased person rests on the fixed bottom beam and does not rest on the moveable side panels. When the side panels are drawn out from under the body and along the sides of the casket, the mitering minimizes shifting of the head. This feature of the invention is particularly advantageous when the deceased person's head should be maintained in a certain position or facing a certain direction.

The invention will now be described with reference to the figures, which show the structural features of the casket without a body placed therein.

Figure 2:
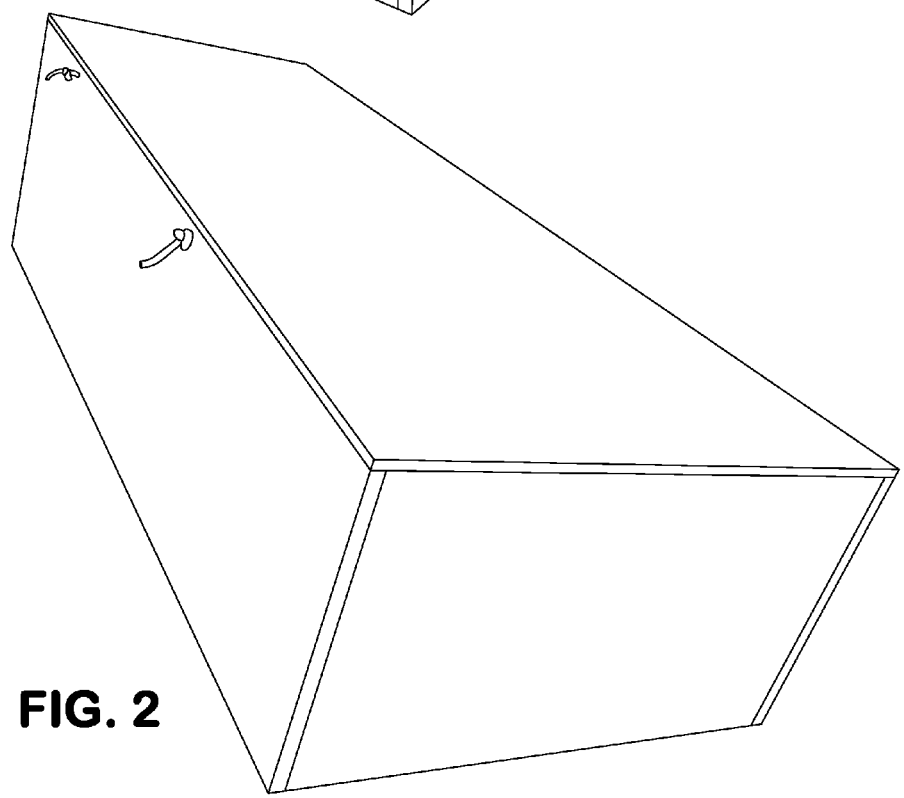
FIG. 2 is a left perspective view of the embodiment of FIG. 1.

FIGS. 1-3 show the outside appearance of an embodiment of the inventive casket, and illustrate the ropes to be drawn to release the body from the casket. In practice, the ropes will be sufficiently long so that individuals standing or kneeling at the top of the grave can comfortably pull the ropes to release the body from the casket.

FIGS. 4 and 5 show the inside of the inventive casket prior to release of the body. The moveable bottom panels are placed on the bottom of the casket and rest on the fixed beams. The ropes are woven around under the bottom of the moveable bottom panels so that they can readily be pulled up to fully release the body in the grave. FIGS. 5 and 6 particularly show the mitering at the location of the person's head. As discussed previously, this mitering prevents the person's head from shifting as the body is released.

FIG. 6 shows the ropes being drawn up, and this action causes the moveable bottom panels to be pulled up and away from the body of the deceased person (not shown), thereby releasing the body for maximal contact with the earth.

FIGS. 7 and 8 show the moveable bottom panels in the fully-released position. After release, the moveable bottom panels are located at the sides of the casket and the person's body (not shown) has been fully released from the casket. The ropes can be trimmed or they can be left in the ground and will generally disintegrate in place.

The various embodiments described above can be combined to provide further embodiments. Aspects of the embodiments can be modified to provide yet further embodiments.

Other objects, advantages and embodiments of the various aspects of the present invention will be apparent to those who are skilled in the field of the invention and are within the scope of the description and the accompanying figure. For example, but without limitation, structural or functional elements might be rearranged, or method steps reordered, consistent with the present invention. Similarly, an element may comprise a single instance of an element or comprise a plurality of elements, such plurality functioning as a single unitary component. The structure of the invention described in various embodiments is not meant to limit the invention to those embodiments or aspects of the present invention, and other components that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed is:

1. A casket comprising:
   four sides including two opposing side walls and two opposing end walls, the casket having a length extending between the two opposing end walls and a transverse width extending between the two opposing side walls;
   a plurality of spaced fixed bottom beams extending across the width of the casket, the four sides and the fixed bottom beams cooperating to define an interior of the casket for receiving a body therein;
   a cover for engaging the four sides to close the interior of the casket;
   at least one moveable bottom panel located within the interior of the casket and on top of the fixed bottom beams; and
   at least one rope affixed to each moveable bottom panel and extending externally of the casket, wherein pulling the at least one rope moves the respective moveable bottom panel.

2. The casket according to claim 1, wherein the casket is biodegradable.

3. The casket according to claim 1, wherein the casket comprises two moveable bottom panels and two ropes are affixed to each bottom panel.

4. The casket according to claim 3, wherein opposing corners of the two moveable bottom panels are mitered for a person's head.

5. The casket according to claim 1, wherein the casket comprises at least three fixed bottom beams, and at least one fixed bottom beam is located in each of a head region, foot region, and midpoint region of the casket.

6. The casket according to claim 1, wherein the casket is devoid of nonbiodegradable components.

7. The casket according to claim 1, wherein the casket is formed from wood, wood pulp, paper, or particleboard.

8. The casket according to claim 1, wherein the dimensions of the cover are smaller than the dimensions of the casket such that the cover does not extend over the sides of the casket.

9. The casket according to claim 1, wherein the the at least one; and rope is threaded through a hole drilled at an angle through the side of the casket.

10. The casket according to claim 1, further comprising one or more handles along the length of the casket to assist in transporting the casket.

* * * * *

UNITED STATES PATENT AND TRADEMARK OFFICE
CERTIFICATE OF CORRECTION

| | | |
|---|---|---|
| PATENT NO. | : 9,050,233 B2 | Page 1 of 1 |
| APPLICATION NO. | : 14/340738 | |
| DATED | : June 9, 2015 | |
| INVENTOR(S) | : Yeshaye Biller and Elchonon Zohn | |

It is certified that error appears in the above-identified patent and that said Letters Patent is hereby corrected as shown below:

In the Claims

Col. 7, lines 4-6:
Claim 9 should read: The casket according to claim 1, wherein the at least one rope is threaded through a hole drilled at an angle through the side of the casket.

Signed and Sealed this
Twenty-ninth Day of September, 2015

Michelle K. Lee
*Director of the United States Patent and Trademark Office*